(12) United States Patent
DeRosia et al.

(10) Patent No.: US 9,009,310 B1
(45) Date of Patent: Apr. 14, 2015

(54) SYSTEM AND METHOD FOR PROVISIONING OF INTERNET ACCESS SERVICES IN A GUEST FACILITY

(75) Inventors: Darrell DeRosia, Cordova, TN (US);
Robert Stroud, Olive Branch, MS (US);
William H. Binns, Frisco, TX (US)

(73) Assignee: HLT Domestic IP LLC, McLean, VA (US)

( * ) Notice: Subject to any disclaimer, the term of this patent is extended or adjusted under 35 U.S.C. 154(b) by 928 days.

(21) Appl. No.: 12/483,816

(22) Filed: Jun. 12, 2009

Related U.S. Application Data

(60) Provisional application No. 61/060,915, filed on Jun. 12, 2008.

(51) Int. Cl.
*H04L 12/14* (2006.01)
*H04L 29/08* (2006.01)
*G06Q 30/06* (2012.01)
*G06Q 50/12* (2012.01)
*G06Q 50/00* (2012.01)

(52) U.S. Cl.
CPC ............... *H04L 12/14* (2013.01); *H04L 67/04* (2013.01); *G06Q 30/0645* (2013.01); *G06Q 50/12* (2013.01); *G06Q 50/00* (2013.01)

(58) Field of Classification Search
USPC ........................................ 709/225, 223, 232
See application file for complete search history.

(56) References Cited

U.S. PATENT DOCUMENTS

| | | | |
|---|---|---|---|
| 6,636,894 B1* | 10/2003 | Short et al. | 709/225 |
| 6,970,459 B1* | 11/2005 | Meier | 370/389 |
| 7,720,031 B1* | 5/2010 | Cheng et al. | 370/331 |
| 7,962,590 B1* | 6/2011 | Or et al. | 709/223 |
| 8,245,276 B1* | 8/2012 | DeRosia et al. | 726/2 |
| 8,893,226 B1* | 11/2014 | DeRosia et al. | 726/2 |
| 2004/0111520 A1* | 6/2004 | Krantz et al. | 709/229 |
| 2005/0154923 A1* | 7/2005 | Lok et al. | 713/202 |
| 2006/0031436 A1* | 2/2006 | Sakata et al. | 709/221 |
| 2006/0206933 A1* | 9/2006 | Molen et al. | 726/14 |
| 2007/0189168 A1* | 8/2007 | Yao | 370/231 |
| 2008/0287094 A1* | 11/2008 | Keeler et al. | 455/406 |
| 2009/0067436 A1* | 3/2009 | Gast et al. | 370/395.53 |
| 2009/0158442 A1* | 6/2009 | Zhang | 726/28 |
| 2009/0287922 A1* | 11/2009 | Herwono et al. | 713/155 |

(Continued)

OTHER PUBLICATIONS

IEEE, 802.1Q, May 19, 2006, IEEE Computer Society, pp. 1-303.*

(Continued)

*Primary Examiner* — Backhean Tiv
(74) *Attorney, Agent, or Firm* — Standley Law Group LLC

(57) ABSTRACT

A system and method for provisioning Internet access services to guests of a facility (e.g., one or more hotel chains). Equipment and devices for access service are installed throughout the facility. Each device that supports the Internet access services has a unique identifier. Zones representing various public and private areas within each facility are defined and one or more devices are associated with each zone. Service offerings for wired and wireless connections are defined and associated with one or more zones. Service offerings are also paired with pricing plans that provide various payment options and amounts. A web-based administration application allows an administrator to define and manage service offerings associated with the zones. The application also allows the administrator to define and manage the pricing plans. The ability to customize offerings in each facility allows development of consistent offerings, regardless of the size or layout of the facility.

16 Claims, 9 Drawing Sheets

(56) References Cited

U.S. PATENT DOCUMENTS

2010/0296441 A1* 11/2010 Barkan ................. 370/328
2010/0332615 A1* 12/2010 Short et al. .............. 709/217

OTHER PUBLICATIONS

Wikipedia, IEEE 802.1Q, pp. 1-5.*

* cited by examiner

Edit Service Offering

This page enables you to edit a Service Offering.

| Edit Service Offering | | | | |
|---|---|---|---|---|
| Service Offering Id: | 1061 — 402 | | | |
| Property Code: | TPABDES-DEF Suites Tampa Brandon — 404 | | | |
| Bandwidth Up: | 256 (kb) | Bandwidth Down: | 512 (kb) — 406 | |
| IP Type: | Both ▽ — 108 | | | |
| Connection Zones: | 1-299,311-899 | Roaming Zones: | 1-899 — 410 | |
| Effective Date: | 12/19/2007 9:43 AM | | | } 412 |
| Expiration Date: | | 12:00 NOON ▽ | (mm/dd/yyy) | |
| Public Description: | 0. Guest Room Select IP-256kb Up/512kb Down (Default Private) | | | } 414 |
| Internal Description: | 0. Guest Room Select IP-256kb Up/512kb Down (Default Private) | | | |

The following price plans and promotions use this service offering. Select the ones you want to modify to use the new version.

| Select All | Price Plan Id | Price Type | Description | Tax | Duration |
|---|---|---|---|---|---|
| ☐ | 1152 | General | Daily Standard Internet Access:Expires 24 hours from time of purchase | $9.95 | 24 HR |
| ☐ | 1151 | General | Daily Standard Internet Access:Expires 24 hours from time of purchase | $9.95 | 24 HR |
| ☐ | 1150 | General | Daily Standard Internet Access:Expires 24 hours from time of purchase | $9.95 | 24 HR |
| ☐ | 1148 | General | Daily Standard Internet Access:Expires 24 hours from time of purchase | $9.95 | 24 HR |

| Select All | Promotion Id | Promotion Type | Description | Tax | Duration |
|---|---|---|---|---|---|
| ☐ | | | | | |

FROM FIG-4A

FIG-4B

ABC Hotels
High Speed Internet Access Management Application

Edit Price Plan
This page enables you to edit a Price Plan.

| Select Property/Brand | Edit Price Plan | | |
|---|---|---|---|
| Property Configuration | | | |
| Service Offerings | Status: | 1152 | |
| Price Plans | Property Code: | TPABDES-DEF Suites Tampa Brandon | — 502 |
| Promotional Codes | Service Offering: | 1061-0. Guest Room Select IP-256kb Up/512kb Down (Default Private) ▽ | — 504 |
| Customer Support | Price Type: | General ▽ | — 506 |
| Usage Reporting | Price $: | 9.95 | Tax | 0 | — 508 |
| Meeting Rooms | | | — 510 |
| Meeting Room Events | Duration: | 24 | Hours ▽ | — 512 |
| Access Codes | | | |
| Logout | | | |

FROM FIG-5A

| | |
|---|---|
| Effective Date: | 12/19/2007 09:48 AM |
| Expiration Date: | [ ] 12:00 NOON ▽ (mm/dd/yyy) |
| Public Description: | Daily Standard Internet Access:Expires 24 hours from time of purchase |
| Internal Description: | Daily Standard Internet Access:Expires 24 hours from time of purchase |
| Long Description: | Daily Standard Internet Access:Expires 24 hours from time of purchase |
| | [Update] [Cancel] |
| Ready: ☑ | |

⟵ 500

514 (Effective Date, Expiration Date)
516 (Public Description, Internal Description, Long Description)

💡 eSupport Help

FIG-5B

TheABCFamily
be hospitable

A Warm Welcome to ABC Chicago O'Hare Airport

Some connections are in person.. some are online.
Stay connected @ The ABC Family of Hotels Please select the High Speed Internet Access plan you wish to use:

| Plan | Price | Duration |
|---|---|---|
| ⦿ Hourly Standard Internet Access | 5.95 | 1 Hour |
| ○ Daily Standard Internet Access | 12.95 | 24 Hour |
| ○ Daily Standard with Public IP Address: If you are using VPN and think that someone from your company may be at this hotel using VPN, or if you are using advanced applications that require an IP address on the internet, this option is recommended | 15.95 | 24 Hour |

Promotion Code

Please use the following for entering any promotional or discount codes provided by the hotel. This is not required for accessing the internet.

Payment Method: [Bill-to-Room ▽]

SYSTEM AND METHOD FOR PROVISIONING OF INTERNET ACCESS SERVICES IN A GUEST FACILITY

CROSS-REFERENCE TO RELATED APPLICATIONS

This application claims priority to U.S. Provisional Patent Application Ser. No. 61/060,915, filed Jun. 12, 2008, titled SYSTEM AND METHOD FOR PROVISIONING OF INTERNET ACCESS SERVICES IN A GUEST FACILITY, which is incorporated herein by reference.

FIELD OF THE INVENTION

The present invention is directed to systems and methods for provisioning Internet access services at guest facilities. In particular, the present invention is directed to a system and method for provisioning of Internet access services in guest facilities according to wired and wireless zones defined within each facility.

BACKGROUND OF THE INVENTION

Guests of many travel facilities such as hotels or other lodging facilities as well as transportation depots such as airports, train stations, and bus stations consider Internet access to be more than an amenity. Many business travelers work while traveling and view Internet access as an important factor in their ability to work while away from the office. They use the Internet to complete work assignments as well as to communicate with their home offices. They may also use it to communicate with their family members back home. Leisure travelers also frequently use Internet access services while traveling. They may use the Internet to plan daily activities or to stay in contact with business colleagues as well as other family members not participating in the vacation. Many guests further use the Internet for entertainment while traveling such as for accessing online games or downloading videos and music. For all guests, the availability of Internet access service, and in particular high-speed Internet access service, is an important consideration when selecting certain facilities such as hotels or other lodging. The availability of fast and reliable Internet access service can influence their decision to select one facility over another.

In addition to expecting fast and reliable service, guests want an Internet access service that is convenient and easy-to-use. Guests need to be able to connect quickly to the Internet without the need to modify or reconfigure their computers to establish the connection or without the need to create and maintain different user accounts that support access to the Internet. Methods for accessing an Internet connection, however, can vary depending upon the type of network or service used by a facility to initiate and support such connections. For example, in the overnight lodging industry, connection methods can vary not only across hotels' brands that are part of the same chain, but even across hotels of the same brand because of differences in the Internet access service offered by each individual hotel.

For many guests, part of an Internet access service that is convenient and easy-to-use includes convenience when paying for Internet access services. For travel facilities that offer many services such as hotels, Internet access service is considered just one of the many amenities. As a result, guests expect to be able to use and pay for the service in the same manner they use and pay for other hotel services such as room service, entertainment services, or health club services. They should be able to request the service and then pay for it using one of several payment methods such as adding the service to a room bill or charging it to a credit card.

Although hotel guests today have specific expectations about the Internet access services, meeting those expectations can be difficult. Different systems may be deployed within a facility or across facilities to provide specific features and functionality. The manner in which systems are interconnected and communicate with each other can have an impact on the Internet access service for guests. As a result, there may be differences in the way services are provisioned and subsequently accessed by a guest. For example, within a hotel chain a guest may see different access service interfaces for the same brand of hotel. Account creation and authentication processes may differ and some hotels within the chain may offer a charge-to-room service while others do not. Finally, wireless connection services may differ between hotels with respect to location, payment options, etc.

Problems that compromise the guest experience such as variability in interface, location, and payment options can be reduced by implementing a solution that allows for more customization and control over the services provided by the guest facility. Providing seamless Internet access services within a single facility as well as across facilities within a brand or a chain requires consistency in the features and functionality that are offered. There is a need for an Internet access service across one or more guest facilities that provides guests with a consistent provisioning experience. There is a need for an Internet access service across one or more guest facilities that provides guests with a consistent access experience after provisioning services. There is a need for an improved system and method for providing Internet access services to guests across one or more facilities.

SUMMARY OF THE INVENTION

The present invention is a system and method for provisioning Internet access services to guests of a travel facility. In an example embodiment, the Internet access service is offered to guests of one or more hotel chains. The system and method support provisioning of Internet access services in guest facilities according to zones (e.g., wired and wireless) defined within each facility. Equipment and devices for wired and wireless Internet access service are installed throughout each hotel. Each device or access point that supports the Internet access services has a unique identifier. Zones representing various public and private areas within each facility are defined and one or more devices are associated with each zone. In addition, service offerings for wired and wireless connections are defined and associated with one or more zones. Service offerings are also paired with pricing plans that provide various payment options and amounts. A web-based administration application allows an administrator to define and manage service offerings that are associated with the public and private zones of the hotel. The application also allows the administrator to define and manage the pricing plans.

The ability to customize offerings in each facility allows a hotel chain to develop consistent service offerings in each facility regardless of the size or layout of the facility. Hotel companies that manage more than one brand of property can develop consistent service offerings within each brand. As a result, the guest experience in accessing the Internet is more predictable and satisfying.

BRIEF DESCRIPTION OF THE DRAWINGS

FIGS. 3-5 are example screens for an administration application to define and manage service offerings and price plans for Internet access services in a hotel; and FIGS. 6 and 7 are sample Internet access screens for use by guests of a hotel.

DETAILED DESCRIPTION

Figure 1:
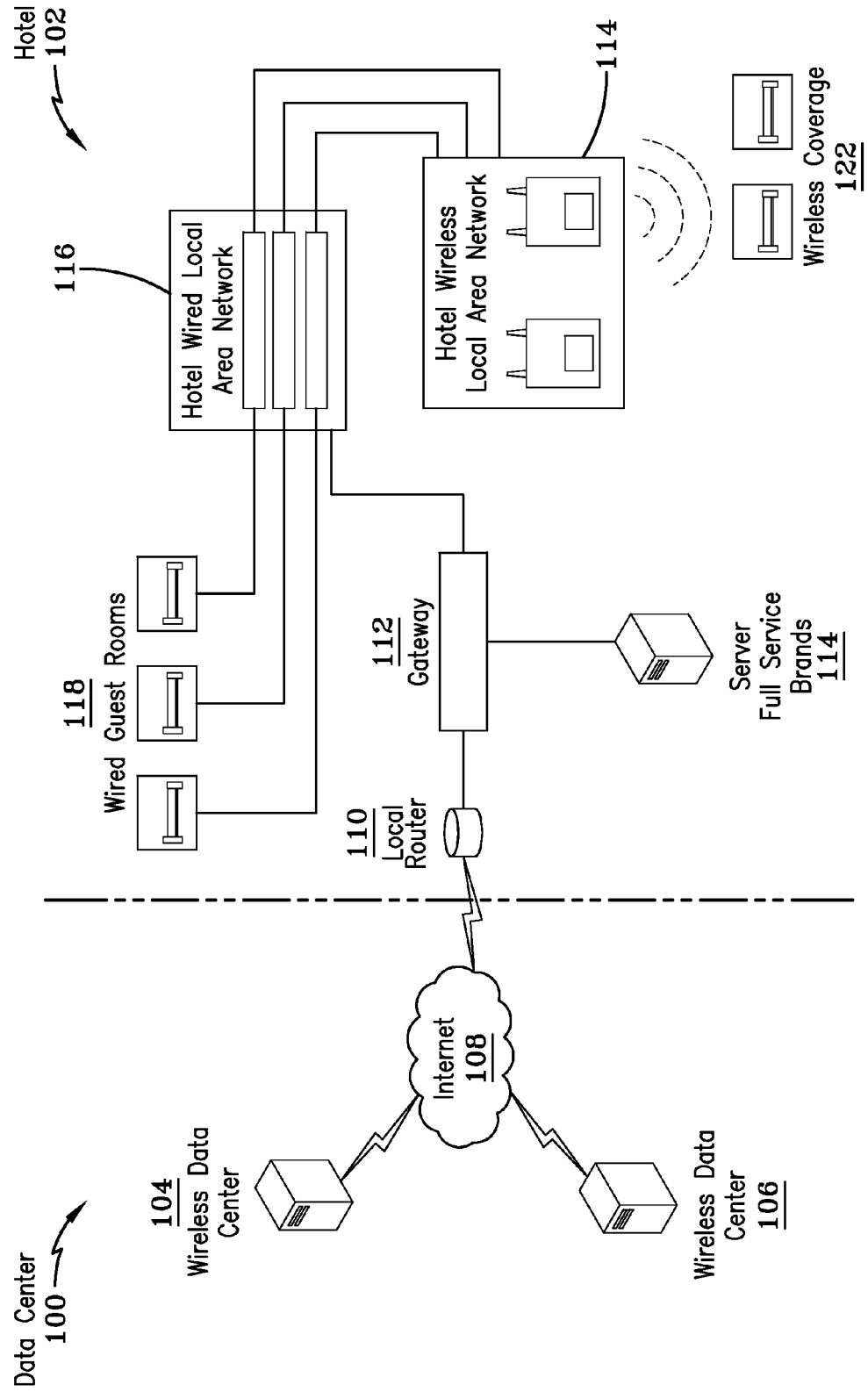
FIG. 1 is a block diagram of devices and components for providing Internet access services in a hotel.

Referring to FIG. 1, a block diagram of devices and components for providing Internet access services is shown. A hotel 102 is equipped with various devices and other equipment (e.g., data ports, cables, etc.) for providing wired and wireless Internet access services to guests. An Internet gateway device 112 manages NATd (network address translation) IPs, provides DHCP (dynamic host configuration protocol) and opens and closes ports allowing hotel guests to access a local router 110 connected to the Internet 108. The gateway device 112 also manages time allotments, such as several hours worth of access, three days of access, etc.

The gateway device 112 may communicate with a property management system (PMS) 114 via an RS-232 cable or similar type of link. When a guest checks into a hotel, identifying information for the guest such as the guest's first and last name is entered into the PMS 114. Identifying information may be received from other sources such as reservation systems. Once the guest is checked into the hotel, additional identifying information such as the guest's room number is added to the data stored in the PMS 114. The guest identifying data such as last name, first name, and room number facilitates confirming the guest's registration status when Internet access services are requested. The PMS 114 provides guest identifying data for guests such as a list of guest names in a specific room number and receives posting transactions from the gateway device 114 via a messaging interface.

The PMS 114 also communicates through the gateway 112, router 110, and Internet 108 via a private WAN with one or more data centers 100. A first data center 104 may provide centralized authentication services to confirm that an Internet access request is from a guest of the hotel. A second data center 106 may provide portal services such as credit card authorization, accounting, billing, and reporting.

Access points and other equipment for defining wired and wireless local area networks (LANs) are installed throughout the hotel. One or more wired networks 116 may be defined to provide wired Internet access services in guest rooms 118 while one or more wireless networks 120 may be defined to provide wireless Internet access services in public areas 122 of the hotel such as the lobby, bar, and restaurants.

Figure 2:
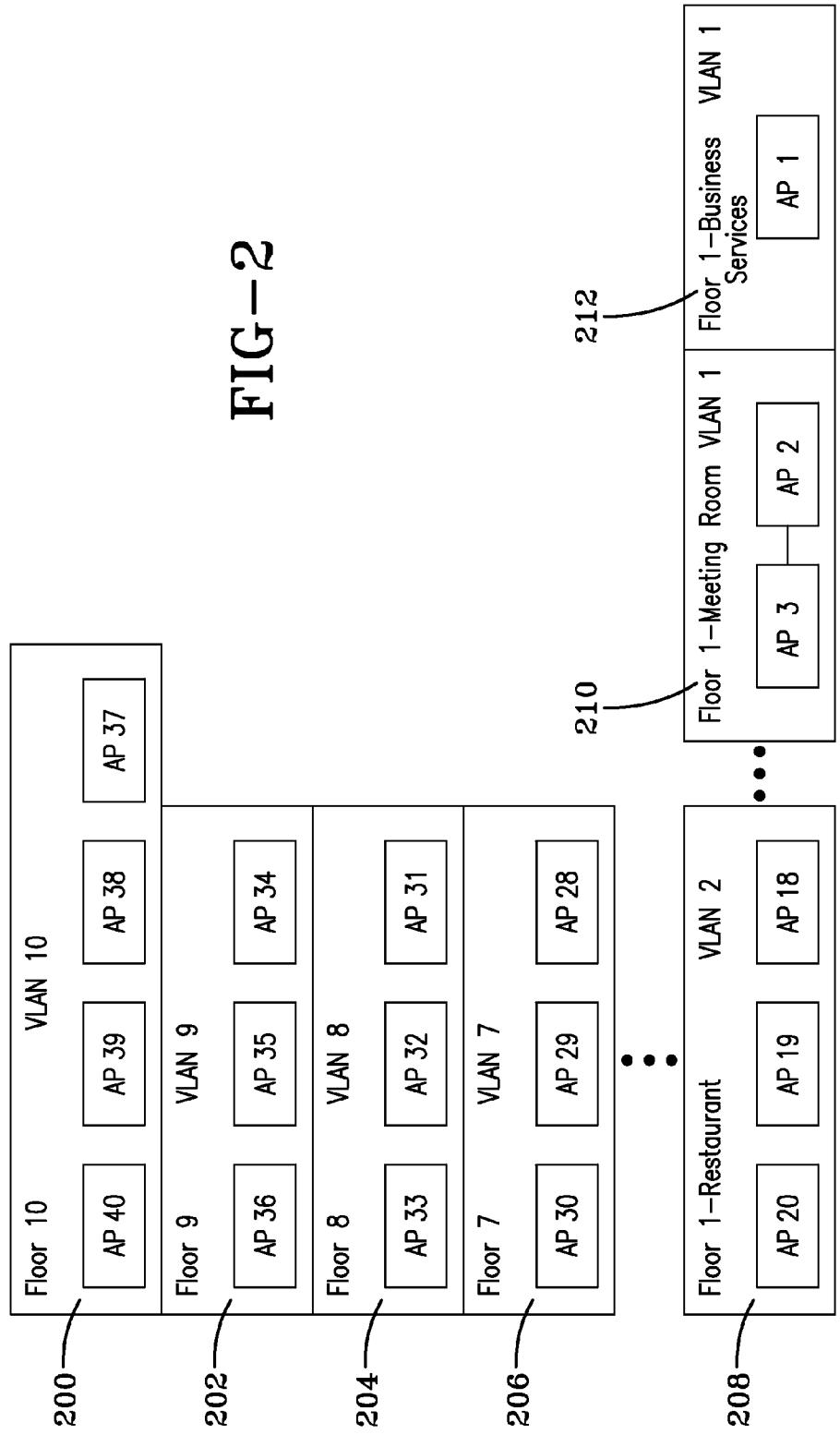
FIG. 2 is a block diagram illustrating the designation of zones providing Internet access in a hotel.

Referring to FIG. 2, a block diagram illustrating the designation of zones to support Internet access services in a hotel is shown. In an example embodiment, access points installed throughout the hotel are grouped into virtual local area networks (VLANs). In the example zone designations of FIG. 2, each guest room floor 200, 202, 204, 206 is defined to be a separate zone and is assigned its own VLAN identifier. The first floor, which may comprise several public areas (e.g., restaurant, lobby, lounge) 208 and semi-private areas (e.g., meeting rooms) 210, 212, may be divided into multiple VLANs. One or more access points are included in each zone identified by a VLAN. Each virtual grouping of access points into a VLAN may correspond to a large or a small physical area within the facility depending upon the needs of the facility. One or more public, semi-private, or private areas may be defined. Zones may also be defined according to the types of service offerings the hotel would like to extend to its guests as well as the pricing plans it would like to offer. The use of zones allows a hotel chain to offer consistent services regardless of the physical layout of each property.

Figure 3:

Referring to FIGS. 3-6, example screens for an administration application to define and manage Internet access service offerings and price plans are shown. Referring to FIG. 3, an example service offering screen 300 is shown. The screen allows a user to review the Internet access service offerings for a selected property. The offerings may be filtered according to status 302. Each offering comprises an identifier 304, a description 306, a minimum and maximum bandwidth for the offering 308, an effective and expiration date 310, and version number 312. An edit option 314 is also provided. As indicated in FIG. 3, different Internet service offerings may be defined for different areas or zones of the hotel such as guest rooms, the hotel lobby, and meeting rooms 306.

Referring to FIG. 4; an example edit service offering screen 400 is shown. The screen allows a user to edit an Internet access service offering for a hotel. The screen identifies the relevant service offering identifier 402 and property code 404. The user can specify a minimum and maximum bandwidth 406 for the offering as well as an IF type 408 (e.g., private, public, or both which allows guest to select type). The user further specifies the connection and roaming zones 410 in the hotel to which the offering applies. The use specifies the connection and roaming zones by referring to the corresponding VLAN identifiers used to designate the zones. Connection zones are zones from which guests may make an initial connection using this service offering. Roaming zones represent zones from which a user is allowed to connect after an initial connection is made from a connection zone. For example, a service offering may be defined that requires a guest to initially connect from a guest room, but subsequently permits access from the lobby or another public area. In the example screen shown, initial connections (i.e., the connection zones) may be made from zones 1-299 and 311-899. Once a guest has made an initial connection from one of the zones in the ranges 1-299 or 311-899, the guest may connect again from any of the zones 1-899. The user may further specify effective and expiration dates for the service offering 412. Finally, the user may edit the public and internal descriptions 414.

At the bottom of the screen, price plans and promotions using the service offering 416 are shown. As indicated, the service offering may be associated with more than one Internet access service price plan or promotion.

Referring to FIG. 5, an example edit price plan screen 500 is shown. The screen allows a user to edit an Internet access service price plan that may be associated with one or more service offerings. The screen identifies the relevant price plan identifier 502 and property code 504. The user can specify a service offering 506 to be associated with the price plan. The user can select a price type 508 (e.g., public, access code, or private), specify a price 510, and select duration ranging from hours to weeks 512. The user may further specify effective and expiration dates 514 for the offering and provide a description 516.

Figure 7:
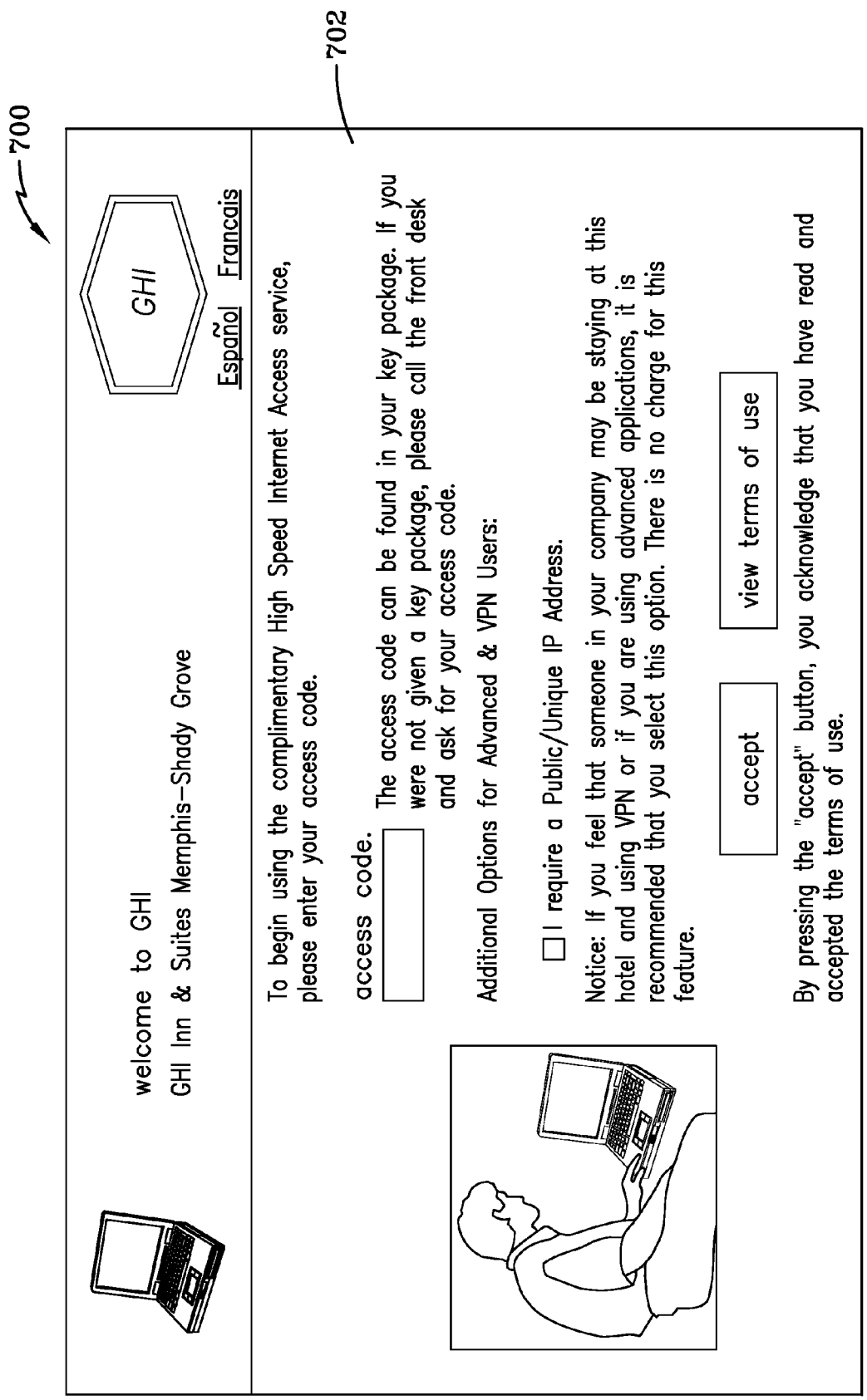

Referring to FIGS. 6 and 7, sample Internet access screens for use by guests of a hotel are shown. Referring to FIG. 6, a sample screen for a guest of a first hotel in a hotel chain is shown. Within the hotel, an access screen is selected for a guest according to the zone in which the guest is stationed when requesting access. When a user requests access, the access point that receives the request provides the VLAN for the zone which is then used along with other information about the guest to determine which Internet access screen to display. For example, if a user is in a guest room using a wired connection, a screen 600 as shown in FIG. 6 may be displayed. The screen displays for the user one or more price plans 602. As shown in the screen, hourly and daily options are presented. In addition, the user may be prompted for a promotion code related to an Internet service promotion offered to the guest 604. For example, frequent guests may receive free services for a certain period of time as part of a loyalty program. Finally, the screen displays for the user a payment option 606. Because user is a confirmed guest in the hotel, the user may be presented with a "bill-to-room" option.

Referring to FIG. 7, a sample screen for a guest of a second hotel in the same hotel chain is shown. Within the hotel, an access screen 700 is selected for a guest according to the zone in which the guest is stationed when requesting access. The access point that receives the request provides the VLAN for the zone which is then used along with other information about the guest to determine which Internet access screen to display. In this example, the service offering requires only an access code 702 from the user to establish an Internet connection.

The present invention allows a company that manages a variety of guest facilities to provision Internet access services efficiently and in a consistent manner across facilities. For companies that manage facilities under different brands, the system and method allow the company to define a consistent guest experience across each brand. The ability to provide a consistent guest experience under a particular brand helps the company to increase each guest's brand awareness and appreciation. The ability to meet an important need of business and leisure travelers helps the company to increase guests' brand loyalty.

Appendix A provides technical details of page layout designs and content for an administration application to support geographic provisioning of Internet access Services. Appendix B provides connection log details regarding information that is stored for each guest Internet connection.

While certain embodiments of the present invention are described in detail above, the scope of the invention is not to be considered limited by such disclosure, and modifications are possible without departing from the spirit of the invention as evidenced by the following claims.

APPENDIX A
Administration Application Technical Details

Page Header

| HSIA Welcome Message | Property Name Property Address | Brand or Family Logo |
|---|---|---|

Description: Page header is displayed on each page of application. Primary purpose is to identify specific property or brand.

Left cell - message identifying the HSIA administration application.
Middle cell - name and address of the currently selected property or brand.
Right cell - brand logo for the currently selected property or brand.

Page Logic: Property or brand is identified by the ctyhocn code retrieved from user's session. When no property is selected, such as on first login, property name and address are blank and the Hilton Family logo is displayed.

Brand logos are specified in property file by appending the brand suffix of the ctyhocn to "BRAND_LOGO_". If a logo is not specified for brand, the default is displayed.

Example:

BRAND_LOGO_HX=...path.../hampton.JPG
BRAND_LOGO_HH=...path.../hilton.JPG
BRAND_LOGO_GI=...path.../gardeninn.JPG
BRAND_LOGO_HW=...path.../homewood.JPG
BRAND_LOGO_DT=...path.../doubletree.JPG
BRAND_LOGO_ES=...path.../embassy.JPG
BRAND_LOGO_CI=...path.../conrad.JPG
BRAND_LOGO_ES=...path.../embassy.JPG
BRAND_LOGO_DEFAULT=...path.../hiltonfamily.JPG

Left Navigation Bar

| Select Property/Brand Log Out |
|---|
| Service Offerings Pricing Plans Promotional Codes |
| Access Zones Meeting Space |
| Customer Support Reporting Property Configuration |

Description: Left navigation bar provides access to functional areas of application. Specific options displayed are determined by authorizations defined for the user and property selected.

Page Logic: Property or brand is identified by the ctyhocn code retrieved from user's session. User's list of role based authorizations is retrieved on login.

Home/Select Property Page

| Page Header | |
|---|---|
| Left Navigation Bar | Home Page Title <br> Home Page Message ................................................................... <br> ........................................................................................................ <br> Alert Message............................................................................ <br> Select the active property <br> Select Brand:   Select a brand[1]   Select State:   Select a state[2] <br> Select Property:   Select a property[3]   Submit[4]   Cancel[5] |

Description: Home/Select Property Page is landing page after user successfully logs into administration application. Also used to select current property.

Page Logic: Page displays common page header. Left navigation bar is not displayed (or disabled) if user does not have a property selected. Header displays current property information and brand logo or a message ("Please select the property to maintain.") and the Hilton Family logo if no property or brand is selected.

Home page displays title and Home page message from property file. Alert message may be displayed (for upgrades, planned maintenance, or other pertinent information).

Regular User: "Select Brand" and "Select State" drop down boxes are not displayed. "Select Property" drop down contains properties (and/or brands) for which they have roles defined.

Super User: "Select Brand" and "Select State" drop down boxes are displayed for users that have at least one role for all properties.

Set Property Command

Description: Sets active property or brand for user. Called from Select Property page. Command checks whether user has access to specified property prior to setting property code in the user's session and cookie.

Logic: Validate Property Code: Requested property/brand is checked against user's authorization list.

---

[1] Select Brand: Select Box, Not Required, Contains the list of brands in the property table.
[2] Select State: Select Box, Not Required, Contains the list of states in the property table.
[3] Select Property: Select Box, Contains the list of properties the users has at least one role for.
[4] Submit: Form Submit Button, Validates that a property is selected and calls Set Property Command
[5] Cancel: Form Reset Button, Resets the Select Property List box to the currently selected property.

Update Session: New property code set in user's session. Newly selected property code is used for all operations until user changes it.

Update Cookie: The new property code is set in the browser cookie. The cookie is used to select the default property at login.

Redirect Browser: The browser is redirected to the Home/Select Property Page.

---

Add Service Offering

Description: Adds a new service offering to database. Called by Add Service Offering Page.

Logic: Validate Data: Bandwidth_up and bandwidth_down are integer fields with non-negative value. Ip_type field is required and has one of the following values: Private, Public, or Both.

Conn_zones and access_zones fields each contain comma separated lists of zone numbers or zone number ranges. Whitespace in field is removed and each comma separated token is examined to ensure it contains a positive integer or a valid range (e.g., 50-121).

Create record: Fields are populated in new record as described below:

| Field | Source |
| --- | --- |
| svc_id | Auto-generated key |
| ctyhocn | Currently selected property/brand. (From session.) |
| bandwidth_up | Form Field |
| bandwidth_down | Form Field |
| ip_type | Form Field |
| conn_zones | Form Field |
| access_zones | Form Field |
| public_desc | Form Field |
| internal_desc | Form Field |
| activated | "N" |
| effective_date | Form Field or the current date/time if blank or in the past. |
| expire_date | Null |
| modified_by | userid (From session.) |
| modified_time | Current Date/Time |
| orig_svc_id | svc_id |
| version | 0 |

Redirect: Browser is redirected to View Service Offerings Page.

---

Edit Service Offering

| Page Header | |
| --- | --- |
| Left Navigation Bar | Edit Service Offering<br>Message [6]................................................................<br>................................................................................................<br>Error Message [7]............................................................ |

| Service Offering Id: | 12345[8] | Property Code: | MEMSGHX[9] |
|---|---|---|---|
| Bandwidth Up: | 128[10] | Bandwidth Down: | 256[11] |
| IP Type: | Select IP Type[12] | Active? | Y[13] |
| Connection Zones: | 101-112,124-148,116[14] | Roaming Zones: | 1-12, 20-44, 1615 |
| Public Description: | Guest Room Access[16] | | |
| Internal Description: | Standard Guest Room Access Private IP 128/25617 | | |
| Effective Date: | 01/01/2006 00:00:00[18] | Expiration Date: | 01/01/2006 00:00:0019 |

The following price plans and promotions use this service offering.
Select the ones you want to modify to use the new version.

| Select All | Price Id | Price Type | Description | Price | Duration |
|---|---|---|---|---|---|
| | 12345 | Public | Daily Guest Room Access | 9.95 | 24 Hr |
| | 12346 | Public | Weekly Guest Room Access | 29.95 | 7 Day |

| Select All | Promo Id | Promo Type | Description | Price | Duration |
|---|---|---|---|---|---|
| | 23456 | Multi-Use | Accenture Conference Promo | 0.00 | 5 Day |
| | 34567 | Single-Use | Food & Beverage Promo | 0.00 | 1 Hr |

| | Update[20] | Cancel[21] | |
|---|---|---|---|

Edit Service Offering Page Design

Description: Edit an existing service offering for currently selected brand/property.

Page Logic: Property code set when the current property is selected on the home page.
Bandwidths are in KB and represent maximum bandwidth a single user is allowed during connection.

IP type can be Private Public or Both. If "Both" is selected, guest is allowed to select IP type when accessing authentication pages.

Effective date cannot be modified if the date is in the past. If the date is in the future, it can be modified to the current date/time or a future date.

Connection and roaming zones are comma separated lists of zone numbers or ranges. Connection zone represents zones from which guest can make initial connection using this service offering. Roaming zones represent zones a user is allowed to connect from once initial connection is made. For example, a service offering can be defined that requires guest to initially connect from guest room, but to subsequently allow access from lobby.

Public description is displayed to guest when connecting to Internet. Internal description is displayed on administrative pages to describe the service.

Update Rules: Existing record is expired with current time as expiration date. A new record is created with a new service id, edited data, current time as effective date and a null expiration date. The original service offering (orig_svc_id) is unchanged and the version is incremented by 1.

Displays a list of unexpired price plans and promotions using the service offering and given the option of updating them to use the new service offering. Any selected price plans or promotions will be copied to new versions using the new service offering and the existing records will be expired.

---

Edit Service Offering

Description: Updates an existing service offering in database. Called by Edit Service Offering Page.

Logic: Validate Data: Bandwidth_up and bandwidth_down are integer fields and required to have non-negative value. Ip_type field is required and has one of the following values: Private, Public, or Both.

Conn_zones and access_zones fields each contain comma separated lists of zone numbers or zone number ranges. Whitespace in field is removed and each comma separated token is examined to ensure it contains a positive integer or a valid range (e.g., 50-121).

Version Record: Records are versioned by expiring existing record and creating a new version.

Existing Record

| Field | Source |
| --- | --- |
| svc_id | Hidden Field – Not updated |
| expire_date | Current date/time |
| expired_by | userid (From session.) |
| expired_time | Current Date/Time |
| orig_svc_id | Not Changed |
| Version | Not Changed |

NewRecord

| Field | Source |
| --- | --- |
| svc_id | Auto-generated key |
| ctyhocn | Currently selected property/brand. (From session.) |
| bandwidth_up | Form Field |
| bandwidth_down | Form Field |
| ip_type | Form Field |
| conn_zones | Form Field |
| access_zones | Form Field |
| public_desc | Form Field |
| internal_desc | Form Field |
| activated | Not changed (will be = "Y") |
| effective_date | Current date/time |
| expire_date | Form Field (null values represent no expiration) |
| modified_by | userid (From session.) |
| modified_time | Current Date/Time |
| orig_svc_id | Not Changed |
| version | Original version +1 |

Update/Version Selected Price Plans: List of price plans updated/versioned according to rules for versioning price plans.

Update/Version Selected Promotions: List of promotions updated/versioned according to rules for versioning promotions.
Redirect: The browser is redirected to the View Service Offerings Page.

Expire Service Offering Page Design

| Page Header | | | | | |
|---|---|---|---|---|---|
| Left Navigation Bar | Expire Service Offering Message [22] ............................................................................. ............................................................................................................... Error Message[23] ....................................................................... | | | | |
| | Service Offering Id: | 12345[24] | Property Code: | MEMSGHX[25] | |
| | Bandwidth Up: | 128[26] | Bandwidth Down: | 256[27] | |
| | IP Type: | Private[28] | Active? | Y[29] | |
| | Connection Zones: | 101-112,124-148,116[30] | Roaming Zones: | 1-12,20-44,16[31] | |
| | Public Description: | Guest Room Access[32] | | | |
| | Internal Description: | Standard Guest Room Access Private IP 128/256[33] | | | |
| | Effective Date: | 01/01/2006 00:00:00[34] | Expiration Date: | 01/01/2007 00:00:00[35] | |
| | The following price plans and promotions use this service offering. Select the ones you want to expire. | | | | |
| | Select All | Price Id | Price Type | Description | Price | Duration |
| | | 12345 | Public | Daily Guest Room Access | 9.95 | 24 Hr |
| | | 12346 | Public | Weekly Guest Room Access | 29.95 | 7 Day |
| | Select All | Promo Id | Promo Type | Description | Price | Duration |
| | | 23456 | Multi-Use | Accenture Conference Promo | 0.00 | 5 Day |
| | | 34567 | Single-Use | Food & Beverage Promo | 0.00 | 1 Hr |
| | | Expire[36] | | Cancel[37] | | |

Expire Service Offering Page Design

Description: Expire an existing service offering for currently selected brand/property.

Page Logic: Displays record to be expired. Shows any existing price plans or promotions using service offering and gives user ability to expire them.

Update Rules: Records are expired by setting the expiration date appropriately.

Expire Service Offering Command

Description: Expires an existing service offering in the database. Called by the Expire Service Offering Page.

Logic: Authorize: The user's roles are checked to see if the user has authority to execute the command for the property/brand selected.

Delete or Expire Record: Records are expired by setting the expiration date appropriately.

Active Records:

| Field | Source |
|---|---|
| svc_id | Hidden Field – Not updated |
| Ctyhocn | Not updated |
| expire_date | Current Date/Time |
| Expired_by | userid (From session.) |
| Expired_time | Current Date/Time |

Expire Selected Price Plans: The list of price plans are expired according to the rules for expiring price plans.

Expire Selected Promotions: The list of promotions are expired according to the rules for expiring promotions.

Redirect: The browser is redirected to the View Service Offerings Page.

---

View Price Plans Page Design

| | Page Header | | | | | | | | | |
|---|---|---|---|---|---|---|---|---|---|---|
| Left Navi-gation Bar | View Price Plans Message[38] ................................................................... | | | | | | | | | |
| | Error Message[39] ....................................................................................... Filter Status: Unexpired[40]    Type:All[41]   Go[42] | | | | | | | | | |
| | Id | Price Type | Descrip-tion | Price(Tax) Duration | Active | Effective Date | Expire Date | Version | | New[43] |
| | 12345[44] | Public | Daily Access[45] | 9.95[46](0.00[47]) 24 Hr | Y[48] | 01/01/2007[49] 00:00:00 | 01/01/2008[50] 00:00:00 | 01234/01[51] | Expire[52] | Edit[53] |
| | 23456 | Public | Weekly Access | 29.95 7 Day | Y | 01/01/2006 | | 23456/00 | Expire | Edit |
| | 23457 | | Monthly Access | 49.95 4 Week | N | 05/05/2006 | | 23457/00 | Expire | Edit |
| | First[54]       Previous[55]       Next[56]       Last[57] | | | | | | | | | |

---

View Price Plans Page Design

Description: Displays Price Plans for currently selected property and enables maintenance of price plans.

Filter drop downs enable filtering records based on status and price plan type. Default is to display all unexpired records. Scroll buttons at bottom of the page enable the user to navigate through list of records.

Page Logic: Displays a list of price plans available for the currently selected property based on display filter. User adds new records, update a record, or delete/expire an existing record.
Inactive records can be deleted; active records can be expired.
Scroll buttons on page allow user to navigate through multiple pages of records.

Create Price Plan Page Design

| Page Header | | | | |
|---|---|---|---|---|
| Left Navigation Bar | Create Price Plan<br>Message [58].................................................................<br>................................................................................................<br>Error Message[59]............................................................ | | | |
| | Price Plan Id: | New...[60] | Property Code: | MEMSGHX[61] |
| | Price Type: | Select Price Type[62] | Service Offering: | Select Service Offering[63] |
| | Price: | 9.95[64] | Duration | 7[65] Select Unit[66] |
| | Tax: | 0.00[67] | Active: | ☐[68] |
| | Public Description: | Guest Room Access[69] | | |
| | Internal Description: | Standard Guest Room Access Private IP 128/256[70] | | |
| | Effective Date: | 01/01/2006 00:00:00[71] | Expiration Date: | 01/01/2006 00:00:00[72] |
| | | Add[73] | Cancel[74] | |

Create Price Plan Page Design

Description: Add a new price plan for currently selected brand/property.

Page Logic: Property code is set when the current property is selected on the home page..\

Price plan type is one of the following: Public, Access Code, or Private. Public and Access Code price plans are presented to guest upon connection to Internet. Access Code plans require the entry of a common, style, access code, and usually have a zero price. Private price plans are for internal use and are used in the meeting planning module.

Service Type Id is svc_id of an unexpired service offering. Price is entered in hotel's local currency. Duration defined as time covered by price plan. Consists of a number and a unit of time, such as 7 Day.

Public Description is displayed to guest when connecting to Internet. Internal Description is displayed on the administrative pages to describe the price plan.

Effective Date can be blank or set to a future date. If the date is blank, set to the current date and time when record is created. Expiration Date can be blank or a date greater than effective date.

Active flag indicates if the price plan is complete and ready for use.

Add Price Plan Command.

Description: Adds a new price plan to database. Called by Add Price Plan Page.

Logic: Authorize: User's roles are checked to see if user has authority to execute command for property/brand selected.

Validate Data: Svc_id is id of an unexpired service offering for current property. Price_type is required and has one of the following values: Public, Access Code, or Private.

Price is 0.00 or a positive number. Duration is an integer greater than 0 and duration_unit is Hr, Day, or Wk.

Effective date is blank or in the future. If blank or a date in past, set to current date/time.

Create record: The fields are populated in the new record as described below:

| Field | Source |
| --- | --- |
| price_id | Auto-generated key |
| ctyhocn | Currently selected property/brand. (From session.) |
| price_type | Form Field |
| Public_desc | Form Field |
| internal_desc | Form Field |
| svc_id | Form Field |
| price | Form Field |
| Duration | Form Field |
| duration_unit | Form Field |
| Active | Form Field |
| effective_date | Form Field or the current date/time if blank or in the past. |
| Expire_date | Form Field |
| modified_by | userid (From session.) |
| modified_time | Current Date/Time |
| orig_price_id | price_id |
| Version | 0 |

Redirect: The browser is redirected to the View Plans Page.

Edit Price Plan Page Design

| Page Header | | | | |
| --- | --- | --- | --- | --- |
| Left Navigation Bar | Edit Price Plan<br>Message [75]..............................................................<br>..............................................................................................<br>Error Message[76]........................................................ | | | |
| | Price Plan Id: | 12345[77] | Property Code: | MEMSGHX[78] |
| | Price Type: | Select Price Type[79] | Service Offering: | Select Service Offering[80] |

| | Price: | 9.95[81] | Duration | 7[82] Select Unit[83] |
|---|---|---|---|---|
| | Tax: | 0.00[84] | Active: | [85] |
| | Public Description: | Guest Room Access[86] | | |
| | Internal Description: | Standard Guest Room Access Private IP 128/256[87] | | |
| | Effective Date: | 01/01/2006 00:00:00[88] | Expiration Date: | 01/01/2006 00:00:00[89] |
| | | Update[90] | Cancel[91] | |

Edit Price Plan Page Design

Description: Edit an existing price plan for currently selected brand/property.

Page Logic: Property code is set when the current property is selected on the home page.

Price plan type is one of the following: Public, Access Code, or Private. Public and Access Code price plans are presented to the guest upon connection to the internet. Access Code plans require the entry of a common, style, access code, and will usually have a zero price. Private price plans are for internal use and are used in the meeting planning module.

Service Type Id is the svc_id of an unexpired service offering. Price is entered in the hotel's local currency. Duration defined the time covered by the price plan. It consists of a number and a unit of time, such as 7 Day.

Public Description is displayed to the guest when connecting to the internet. The Internal Description is displayed on the administrative pages to describe the price plan.

Effective Date can be blank or set to a future date. If the date is blank, it is set to the current date and time when the record is created. Expiration Date can be blank or a date greater than the effective date.

Active flag indicates if the price plan is complete and ready for use. A new version of the price plan is created when modifications are made.

Update Rules: Records are updated by creating a new version. Existing record expires with the current time as expiration date. A new record is created with a new price id, the edited data, the current time as the effective date and the edited expiration date. Original price plan (orig_price_id) is unchanged and the version is incremented by 1.

Edit Price Plan Command

Description: Updates an existing price plan in database. Called by the Edit Price Plan Page.

Logic: Authorize: User's roles are checked to see if user has authority to execute command for property/brand selected.

Validate Data: Svc_id is id of an unexpired service offering for current property.
Price_type has one of the following values: Public, Access Code, or Private.

Price is 0.00 or a positive number. Duration is an integer greater than 0 and duration_unit is Hr, Day, or Wk.

Effective date is blank or in future. If blank or a date in past, set to the current date/time.

Update or Version Record: Active records are versioned.

Active Records – Existing Record

| Field | Source |
|---|---|
| Price_id | Hidden Field – Not updated |
| expire_date | Current date/time |
| expired_by | userid (From session.) |
| expired_time | Current Date/Time |
| orig_price_id | Not Changed |
| version | Not Changed |

Active Records – NewRecord

| Field | Source |
|---|---|
| price_id | Auto-generated key |
| ctyhocn | Currently selected property/brand. (From session.) |
| Price_type | Form Field |
| public_desc | Form Field |
| internal_desc | Form Field |
| svc_id | Form Field |
| Price | Form Field |
| duration | Form Field |
| duration_unit | Form Field |
| active | Not changed (will be = "Y") |
| effective_date | Current date/time |
| expire_date | Form Field (null values represent no expiration) |
| modified_by | userid (From session.) |
| modified_time | Current Date/Time |
| orig_price_id | Not Changed |
| version | Original version +1 |

Redirect: The browser is redirected to the View Price Plans Page.

Expire Price Plan Page Design

| Page Header | | | | |
|---|---|---|---|---|
| Left Navigation Bar | Expire Price Plan<br>Message [92]..............................................<br>..........................................................................<br>Error Message[93]............................................ | | | |
| | Price Plan Id: | 12345[94] | Property Code: | MEMSGHX[95] |
| | Price Type: | Public[96] | Service Offering: | Guest Room Service[97] |
| | Price: | 9.95[98] | Duration | 7[99] Day[100] |

| | Tax: | 0.00[101] | Active: | [102] |
|---|---|---|---|---|
| | Public Description: | Guest Room Daily Access[103] | | |
| | Internal Description: | Standard Guest Room Access Private IP 128/256[104] | | |
| | Effective Date: | 01/01/2006 00:00:00[105] | Expiration Date: | 01/01/2006 00:00:00[106] |
| | | Expire[107] | Cancel[108] | |

Expire Price Plans Page Design

Description: Edit an existing price plan for currently selected brand/property.

Page Logic: Displays record to be expired or deleted.

Update Rules: Records not flagged as active can be deleted from database; active records are expired.

Expire Service Offering Command

Description: Expires or deletes an existing price plan in database. Called by Expire Price Plan Page.

Logic: Authorize: User's roles are checked to see if user has authority to execute command for property/brand selected.

Delete or Expire Record: Records are expired by setting the expiration date appropriately.

Active Records:

| Field | Source |
|---|---|
| Price_id | Hidden Field – Not updated |
| Ctyhocn | Not updated |
| expire_date | Current Date/Time |
| expired_by | userid (From session.) |
| expired_time | Current Date/Time |

Redirect: The browser is redirected to the View Price Plans Page.

APPENDIX B
Connection Log Details

Connect Log

Table Name: conn_log

Table Description: Contains information about guest's connection to HSIA service. Provides analytical data about system usage and guest experience.

Table Use: Connection record is created whenever a guest initiates authentication process at a property. Guest is identified initially by MAC address provided by gateway. Subsequent requests from same MAC address and property update record until guest successfully connects or a 12 hour period of inactivity passes.

Columns:

| Field | Logical Datatype | Foreign Key Table | Description |
|---|---|---|---|
| conn_id | Integer | | Unique identifier for the record. |
| ctyhocn | String | Hotel | Property code for which price plan is available. |
| gateway_ip | String | | IP address of gateway at property. |
| mac_addr | String | | MAC Address of guest's computer. |
| last_req_date | Timestamp | | Timestamp of last request in this connection attempt. |
| cas_status | String | | Current status of this connection attempt (pending, connected, cancelled, or expired). |
| init_date | Timestamp | | Timestamp of initial request in this connection attempt. |
| user_ip | String | | Guest's IP address. |
| init_url | String | | URL requested in initial request of this connection request. |
| init_reqs | Integer | | Number of requests to initial login page in this connection attempt. Indicates the number of spurious attempts (e.g., Windows Update requests). |
| total_reqs | Timestamp | | Total number of requests in this connection attempt. This number minus number of spurious attempts indicates number of requests guest required to complete connection. |
| conn_zone | Timestamp | | Zone from which guest connected. |
| conn_date | String | | Timestamp when connection attempt is completed. |
| price_id | Timestamp | price_plan | Price plan id used to connect. |
| promo_id | String | | Promo plan id used to connect. |
| price | Integer | | Price paid for internet access. |
| duration | Integer | | Duration of access. |
| duration_unit | Integer | | Unit of measure for duration. |
| name | String | | Guest's last name. Only available for credit card or bill to room connections. |
| room | String | | Guest's room number. Available for bill to room connection. |
| pay_method | String | | Guest's method of payment. Click-Through, Access Code, Credit Card, or Bill-To-Room. |
| card_type | String | | Credit card type used, if applicable. |
| svc_id | Integer | service_offering | Service id used to connect (from price plan). |

The invention claimed is:

1. A method for provisioning of Internet access services in a guest facility comprising:
  (a) defining within said guest facility a plurality of zones for providing Internet access services to guests of said guest facility, each of said zones relating to a physical location in said guest facility and comprising a plurality of access points;
  (b) for each of said zones in said guest facility, assigning one virtual local area network identifier to each of said plurality of access points in said zone;
  (c) defining a plurality of Internet service offerings, each of said service offerings defining an option for a guest to receive Internet access in a zone within said guest facility and comprising:
    (i) a property code; and
    (ii) a plurality of connection zone identifiers corresponding to said virtual local area network identifiers assigned to said zones in said guest facility;
  (d) receiving at an authentication server from an access point a request from a guest for Internet access, said request comprising identifying information for said guest, one of said plurality of property codes, and one of said plurality of connection zone identifiers;
  (e) confirming through a property management computer system using said identifying information said guest's registration status;
  (f) selecting for said guest using said one of said plurality of property codes and said one of said plurality of connection zone identifiers an associated Internet service offering for said guest to receive Internet access;
  (g) transferring to said access point for display at said guest's computer an access screen for selecting said associated Internet service offering; and
  (h) receiving from said guest's computer a selection of said associated Internet service offering.

2. The method of claim 1 wherein defining within said guest facility a plurality of zones for providing Internet access services comprising defining at least one zone for providing wired Internet access services and at least one zone for providing wireless Internet access services.

3. The method of claim 1 wherein defining within said guest facility a plurality of zones for providing Internet access services comprises defining zones selected from the group consisting of:
  private zones, semi-private zones, and public zones.

4. The method of claim 3 wherein said guest facility is a hotel.

5. The method of claim 4 wherein said private zones comprise guest rooms in said hotel, said semi-private zones comprise meeting rooms in said hotel, and said public zones comprise restaurants.

6. The method of claim 1 wherein defining a plurality of Internet service offerings comprises defining service offerings with an option selected from the group consisting of:
  an access code option and a payment method option.

7. The method of claim 6 wherein said payment method option comprises an option selected from the group consisting of:
  credit card payments and bill-to-room payments.

8. The method of claim 1 wherein said service offerings comprise a bandwidth minimum and maximum, an IP connection type, and an expiration date.

9. A system for provisioning of Internet access services in a guest facility comprising:
  (a) a plurality of access points within said guest facility;
  (b) database for storing data identifying:
    (1) a plurality of zones within said guest facility for providing Internet access services to guests of said guest facility, each of said zones relating to a physical location in said guest facility;
    (2) a subset of said access points in each of said zones;
    (3) a virtual local area network identifier for each zone;
    (4) a plurality of Internet service offerings, said each of said service offerings defining an option for a guest to receive Internet access in a zone within said guest facility and comprising:
      (i) a property code; and
      (ii) a plurality of connection zone identifiers corresponding to said virtual local area network identifiers assigned to said zones in said guest facility;
  (c) an authentication server in communication with at least one of said access points for receiving a request from a guest for Internet access, said request comprising:
    (1) identifying information for said guest;
    (2) one of said plurality of property codes; and
    (3) one of said plurality of connection zone identifiers;
  (d) a property management computer system in communication with said authentication server to receive said identifying information for said guest and to confirm said guest's registration status; and
  (e) a guest computer for receiving from said access point display screen data for selecting for one of said plurality of Internet service offerings according to said one of said property codes and said one of said plurality of connection zone identifiers.

10. The system of claim 9 wherein said plurality of zones comprises at least one zone for providing wired Internet access services and at least one zone for providing wireless Internet access services.

11. The system of claim 9 wherein said plurality of zones are selected from the group consisting of:
  private zones, semi-private zones, and public zones.

12. The system of claim 9 wherein said guest facility is a hotel.

13. The system of claim 12 wherein said private zones comprise guest rooms in said hotel, said semi-private zones comprise meeting rooms in said hotel, and said public zones comprise restaurants.

14. The system of claim 9 wherein said Internet service offering comprises service offerings with an option selected from the group consisting of:
  an access code option and a payment method option.

15. The system of claim 14 wherein said payment method option comprises an option selected from the group consisting of:
  credit card payments and bill-to-room payments.

16. The system of claim 9 wherein said service offerings comprise a bandwidth minimum and maximum, an IP connection type, and an expiration date.

* * * * *

UNITED STATES PATENT AND TRADEMARK OFFICE
CERTIFICATE OF CORRECTION

| | | |
|---|---|---|
| PATENT NO. | : 9,009,310 B1 | Page 1 of 1 |
| APPLICATION NO. | : 12/483816 | |
| DATED | : April 14, 2015 | |
| INVENTOR(S) | : Darrell De Rosia, Robert Stroud and William H. Binns | |

It is certified that error appears in the above-identified patent and that said Letters Patent is hereby corrected as shown below:

In the Claims:
Claim (1) Column (33) Line (24)
Please delete "properly" and insert --property--.

Signed and Sealed this
Fifteenth Day of September, 2015

Michelle K. Lee
*Director of the United States Patent and Trademark Office*